(12) United States Patent
Sönsteröd et al.

(10) Patent No.: US 6,311,812 B1
(45) Date of Patent: Nov. 6, 2001

(54) DEVICE AND APPLICATION INVOLVING TWO PARTS WORKING AWAY FROM AND TOWARDS EACH OTHER AND ENERGY-ABSORBING DEVICE

(75) Inventors: Lars Sönsteröd, Sandared; Håkan Malmborg, Jönköping; Martin Lindholm, Hok, all of (SE)

(73) Assignee: Öhlins Racing AB, Väsby (SE)

( * ) Notice: Subject to any disclaimer, the term of this patent is extended or adjusted under 35 U.S.C. 154(b) by 0 days.

(21) Appl. No.: 09/256,172

(22) Filed: Feb. 24, 1999

(30) Foreign Application Priority Data

Mar. 10, 1998 (SE) .................................................... 9800775

(51) Int. Cl.$^7$ ........................................................ F16F 9/34
(52) U.S. Cl. ................................. 188/322.13; 188/266.6
(58) Field of Search ............................. 188/322.13, 313, 188/322.15, 266.2, 266.5, 266.6; 251/120.121, 122

(56) References Cited

U.S. PATENT DOCUMENTS

| | | | |
|---|---|---|---|
| 209,290 | * 10/1878 | Pierce ................................... | 251/120 |
| 1,634,360 | * 7/1927 | Hofmann ............................. | 251/120 |
| 4,531,708 | * 7/1985 | Livet ..................................... | 251/48 |
| 4,961,561 | * 10/1990 | Kamibayasi ........................ | 251/120 |
| 5,137,125 | * 8/1992 | Troltsch et al. ................. | 188/322.15 |
| 5,163,538 | * 11/1992 | Derr et al. ........................... | 188/318 |
| 5,251,370 | * 10/1993 | Ackermann et al. ................ | 188/299 |
| 5,431,259 | * 7/1995 | Mizutani et al. .................... | 188/299 |
| 5,871,109 | * 2/1999 | Litten .............................. | 188/322.13 |

FOREIGN PATENT DOCUMENTS 2 234 041 * 1/1991 (GB) .................................. 188/318

* cited by examiner

Primary Examiner—Robert J. Oberleitner
Assistant Examiner—Thomas J. Williams
(74) Attorney, Agent, or Firm—Connolly Bove Lodge & Hutz LLP (57) ABSTRACT

A device, e.g. a pressure regulator, for realizing an opening and/or closing function in connection with the force-velocity curves of the device incorporates two parts which work away from and towards each other at different velocities and accelerations, e.g. slide and housing. The parts work with a stroke and determine, in dependence upon the present size of the stroke, the passage of a fluid by way of a restrictor function realized by the parts. At least the one part (the slide) is subjected to force on both its sides. The restrictor function is made up of at least two part-restrictors which can be simultaneously actuated by a respective stroke and thereupon vary, preferably successively, their restrictor sizes differently from each other in dependence upon the respective stroke size. In the restrictor function, a passage of fluid is herein obtained which produces a smooth curve shape in the introductory and concluding part of the respective opening or closing function.

15 Claims, 5 Drawing Sheets fig 1
(PRIOR ART)

DEVICE AND APPLICATION INVOLVING TWO PARTS WORKING AWAY FROM AND TOWARDS EACH OTHER AND ENERGY-ABSORBING DEVICE

TECHNICAL FIELD

The present invention relates to a device for realizing an opening and/or closing function in terms of its force/velocity curves. The device is of the type which comprises two parts working away from and towards each other, at different velocities and accelerations. Examples of the said working parts can be cone and seat, slide and housing, etc. The said working parts work with a stroke and determine, in dependence upon the present stroke sizes, the passage of a fluid by way of a restrictor function realized by the parts. At least the one part, e.g. the cone, slide, etc., is subjected to force on both its sides.

The invention is also assignable to a device for achieving in a pressure regulator or pressure-limit valve an opening or closing process between two parts working away from and towards each other and which work with a stroke and determine, in dependence upon the present stroke size, the passage of a fluid by way of a restrictor function realized by the parts, in which at least the first part is subjected to force such that pressure regulation is realizable by means of equilibrium between the obtaining regulator force and the corresponding cumulative force, e.g. realized by one or more springs, flow forces, pilot pressure forces, etc.

The invention also relates to an application of at least two series-connected restrictors in a device which realizes an opening and/or closing function in terms of its force-velocity curves. The application is effected in a device comprising two parts which work away from and towards each other at different velocities and accelerations and which work with a stroke and determine, in dependence upon the sizes of the strokes, the passage of a fluid by way of a restrictor function realized by the parts and in which the one part is subjected to force on both its sides.

In purely general terms, the invention can be assignable to various types of governor valves for shock absorbers intended for use in vehicles. The new device and the application can specifically be used in shock absorbers which are intended to form part of wheel suspension systems for vehicles (cars, motor cycles, etc.)

The invention relates primarily to valves which are used to control pressure, i.e. to generate shock-absorption forces/shock-absorption pressure as a function of the shock absorber strokes and piston velocities/flows. The said shock absorber forces and shock absorber strokes constitute an energy absorption function for controlling or monitoring wheel motions and chassis motions.

PRIOR ART

Figure 1:
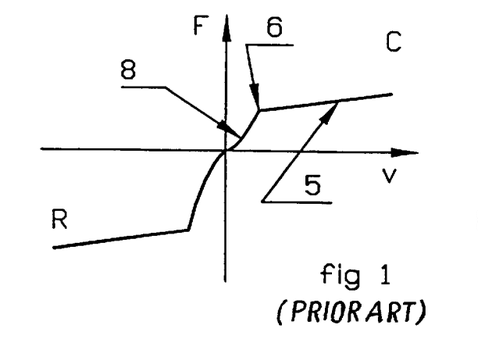
FIG. 1 shows a simplified static velocity-force diagram for a conventional shock absorber.
Figure 2:
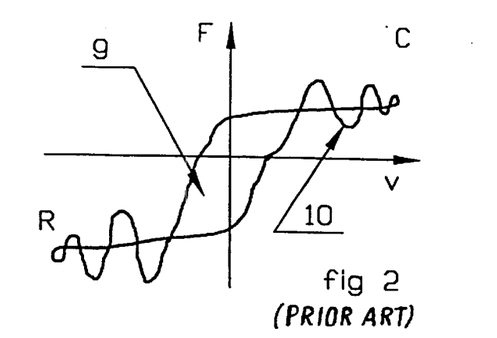
FIG. 2 shows a simplified dynamic velocity-force diagram for a conventional shock absorber.
Figures 5, 6:
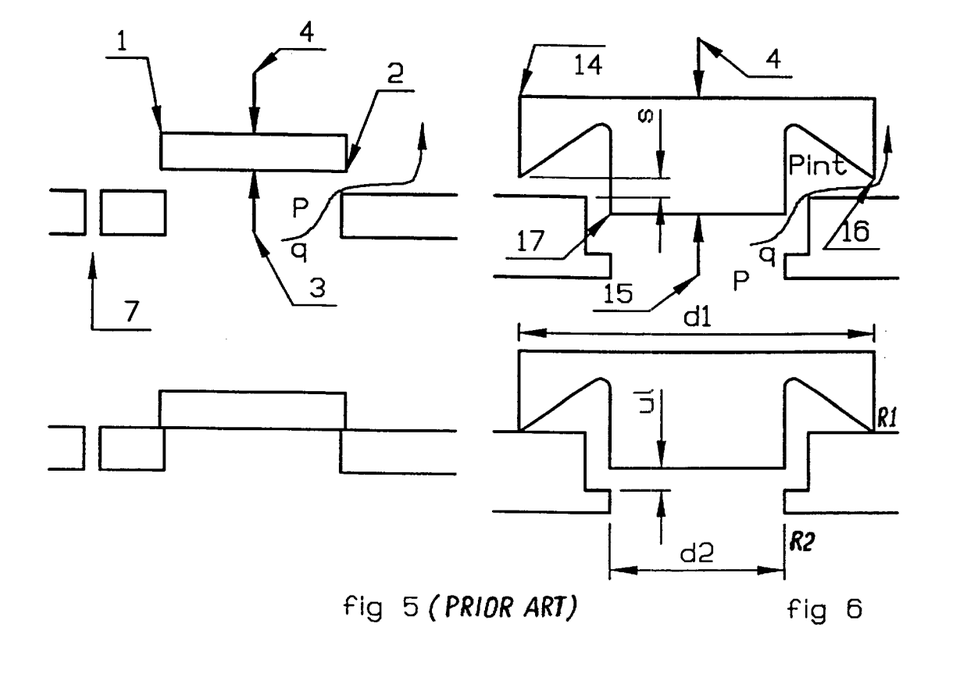
FIG. 5 shows in elementary representation a pressure-control device of known type, in which the governor valve is shown in open and closed position.
FIG. 6 shows in elementary representation a pressure-control device with smooth opening function according to the invention, the valve being shown in open and closed position.

Reference is made, inter alia, to the following FIGS. 1, 2 and 5. Valves (governor valves) which are currently used in shock absorbers normally utilize a pressure-controlling device (denoted as 1 in FIG. 5) equipped, for example, with shims, cone or plate, which form a main restrictor (2 in FIG. 5). The pressure control is achieved with the aid of force equilibrium between the regulator force 3, i.e. the regulator pressure force on the one hand, and supplementary forces 4, i.e. spring force, flow force, valve-damping force, friction force and, in certain cases, pilot pressure force on the other hand. Depending on the level in the flow force and the spring force level, the pressure control can be carried out with different governor characters (5 in FIG. 1), i.e. a certain increase in force as a function of the increase in velocity (piston velocity). Such types of arrangement are designated in hydraulic terms as pressure regulators.

The pressure regulator in question has a pronounced opening point (6 in FIG. 1), at which the governor valve, during a shock absorber acceleration, is about to open or close the pressure control facility as a function of velocity. Before the point, at low velocities, the pressure is dependent only upon a fixed restrictor or restrictors (7 in FIG. 5), which give rise to a leak or bleed curve (8 in FIG. 1). This restrictor function is often designated as "bypass".

Normal pressure regulators for shock absorbers are constructed with the aid of preselected leak curves and governor characters.

Account of the Invention

TECHNICAL PROBLEM

In conventional shock absorbers and valve constructions, for example, there are difficulties in adapting the adjustment of the damping character of the shock absorber to a small bleed and flat/plane governor character. Rough or jerky functioning is unavoidable in these cases. There is a need to be able to obtain smooth shock absorber behaviour in the shock absorbers in question given different types of adjustments. The invention solves this problem.

The change in force level at the pronounced opening point ("blow-off point") always causes vibrations whenever the shock absorber shifts between positive and negative velocities, i.e. changes between compression (C in FIG. 1) and expansion (R in FIG. 1). The lower the said "by pass" level the more accentuated becomes this behaviour in those cases in which the pressure regulator has to be constructed with a flat governor character, i.e. has to have a low increase in damping force combined with increased velocity. Valves of this type produce a pronounced roughness or jerkiness whenever the shock absorber is working. The invention sets out to solve this problem also.

There are traditional ways of smoothing the roughness and the jerkiness. The most common and easy method is to use soft rubber springing between the shock absorber and the chassis. This method, like other similar methods, of finding a solution to the raised problem gives rise to unwanted springing (9 in FIG. 2) of the damping force. This problem can be seen with the aid of, for example, a diagram showing the damping force relative to the velocity during cycles between compression and expansion. In connection herewith, it is also apparent that the roughness and jerkiness are transformed into unwanted damped vibrations (10 in FIG. 2) in the rubber springing, which thus constitutes an insulation problem. The invention solves these problems also.

The vibrations which arise in the opening and closing processes in conventional valves have to be damped inside the valve in order to avoid undamped or stationary oscillations. Such inner dampings provoke, in turn, an inertia in the valve, which inertia produces delays and greater amplitude in the damped oscillations. The invention solves these problems also.

In valves of this kind, the problem arises of making the valves more seal-tight at higher modulation levels. Likewise, there may be a requirement to alter the curves in the static velocity and force diagram by means of a simple adjustment procedure. There is also a need in certain cases to avoid tolerance sensitivities. In one embodiment it is also important, especially in the opening function, to be able to prevent a tendency for the fluid to adhere to a surface or surfaces of the cone and/or seat. The invention solves these problems also.

It is important that the problems in question can be solved by intrinsically technically simple means. The invention solves this problem also.

THE SOLUTION

What can primarily be considered characteristic of a device of the type first named above is that the said restrictor function is made up of at least two part-restrictors which can be simultaneously actuated by a respective stroke and thereupon vary, preferably successively, their restrictor sizes differently from each other in dependence upon the respective stroke size in order in the restrictor function to give rise to a passage of fluid which produces a smooth curve shape in the introductory or concluding part of the respective opening or closing function.

In refinements of the device, the two part-restrictors are each related to their own governor area and the governor areas differ in size. The governor areas are arranged so as to alter their sizes in dependence upon the sizes of the common stroke and the part-restrictors mutually vary their sizes in dependence upon how quickly the areas of the part-restrictors grow or diminish as a function of the common stroke. In a further embodiment, the part-restrictors consist of inner and outer part-restrictors. The inner part-restrictor, when the stroke is smaller, has a larger size, which means that it has no substantial influence upon the process of the restrictor function and, when the stroke is larger, has a smaller size, which means that it dominates the process of the restrictor function. The outer part-restrictor can reduce its influence upon the process in question, i.e. increase its size, when the stroke is larger, i.e. when the damping velocity increases. The two restrictors can successively increase and reduce their influences upon the process of the restrictor function by respectively reducing and increasing their sizes. It is evident from this that the respective restriction according to the above is an area-related variable. In connection with the use of the new device in a combined shock absorber and spring suspension system, the device realizes a sufficiently smooth variation of the damping force to produce little roughness and/or jerkiness for the relative motions of the piston and cylinder. The smooth variation of the damping force results in a low degree of vibration in the system per se and/or a faster valve (or equivalent) by virtue of the reduced need for inner damping.

A device of this kind can also be considered to be primarily characterized in that the said parts are arranged so as to achieve, for the first part, two areas which are dependent upon the size of the respective stroke and which together with an existing flow constant define directly area-related outer and inner restrictors. When stroke sizes are small, the outer restrictor is smaller in size (i.e. it has greater influence upon the process in question) than the inner restrictor. As stroke sizes increase, the inner restrictor is smaller in size (i.e. it has greater influence upon the process in question) than the outer restrictor. The said change in the sizes of the restrictors has the effect that an intermediate pressure which arises between the restrictors successively diminishes or increases during a respective first and second part of the opening and closing function respectively. The moving part works with two pressure areas, the differential area of which can be acted upon by the said intermediate pressure to create a force which forms the basis of a smooth curve shape in connection with the introductory or concluding part of the opening and closing function respectively.

The new device can also primarily be considered to be characterized in that, for the achievement of a smooth opening and closing process respectively, the force equilibrium between the obtaining regulator force and an accumulative force in question is realized by means of a successively diminishing and increasing regulator area respectively directly after the opening process of the regulator and following on from the later part of the closing process of the regulator.

In certain cases, a continuous hole in the seat or equivalent and/or a notch in the cone or slide are utilized. This can yield high manufacturing precision, which, together with the application of part-restrictors in the same plane, produces high repeatability in the device.

An application of the type stated in the introduction can primarily be considered characterized in that the two series-connected restrictors are used to form together the restrictor function in the device in question and to generate in this a passage of fluid which produces a smooth curve shape in at least the introductory and concluding part of the opening and closing function respectively by mutually altering their restrictor sizes, preferably successively, in dependence upon the present stroke sizes.

In one embodiment of the application, the restrictors are used as an outer part-restrictor with great influence upon the size of the restrictor function with small strokes and less influence or shut-off effect with large strokes and as an inner part-restrictor with little influence upon the size of the restrictor function with small strokes and greater influence upon the last-named size with large strokes.

ADVANTAGES

As a result of what has been proposed above, governor valves for shock absorbers are obtained which drastically reduce roughness, jerkiness and vibration tendencies in shock absorbers and spring suspension systems. Moreover, the valve can be made faster and greater seal-tightness is achieved at high modulation levels. Simple adjustment functions can also be arranged. Components which are known per se can be used, which enables a technically simple construction and relatively low manufacturing costs. In the arrangement of the part-restrictors in the same plane, the part-restrictors can be finished in one and the same work phase of the cone and seat parts, which means that parts with small tolerances are obtainable, resulting in enhanced functioning in the parts and lower labour costs. Moreover, in current embodiments, a jet of fluid created at the inner restrictor is prevented from hitting the cone or equivalent and/or actuating the discharge restrictor.

DESCRIPTION OF FIGURES

A currently proposed embodiment of a device according to the invention shall be described below with simultaneous reference to the appended drawings, in which:

FIG. 8 shows in vertical view and enlargement end parts of the valve according to FIG. 7, FIGS. 9 and 9a show in elementary representation two alternative embodiments based upon the principle according to FIG. 6, FIGS. 10 and 10a show respectively in elementary representation a further embodiment based upon the principle according to FIG. 6 and a static velocity and force diagram according to the same principles as in FIG. 3, and FIGS. 11 through 14b show four further embodiments in addition to the embodiments mentioned above.

DETAILED EMBODIMENT

In accordance with the invention, in an illustrative embodiment two governor edges are utilized, an outer one and an inner one. These governor edges define restrictors R1 and R2, the size of which is dependent upon the stroke (stroke length) s. FIG. 6 shows a simple example in which $R1=kq*\pi*d1*s$ and $R2=kq*\pi*d2*(s+uL)$, i.e. $R1=kq*a1$ and $R2=kq*a2$ and a1 and a2 respectively are stroke-dependent areas and kq are flow constants which, multiplied by the area, give an area-related restriction.

Area coefficients $ka1=\pi*d1$ and $ka2=\pi*d2$ are in this case two constants which depend upon the magnitude of d1 and d2. During opening when s=0, R=0 and $R2=kq*ka2*uL$ are obtained. This position is called the opening point (alternatively: cracking point, blow-off point). The governor restriction of the valve is determined, including when the stroke is small, by R1, which in this case is less than R2. Since, however, the area coefficient ka2 is less than ka1, as the stroke increases R2 comes to be less than R1, as is apparent from the expressions for R1 and R2.

The variations in R1 and R2 above cause a successively diminishing pressure in the space ($P_{int}$) between the two restrictors during a first part of the opening process, which is here designated as the smooth-opening part. The intermediate pressure $P_{int}=P*R2^2/(R^2+R1^2)=P*G1$, in which G1 is a geometry factor which describes the influence of the two series-connected restrictors upon the intermediate pressure emanating from the regulator pressure P.

The two pressure areas $A1=\pi/4*d1^2$ and $A2=\pi/4*d2^2$ therefore come to interact. The intermediate pressure $P_{int}$ gives a force which is determined by the area Ad=A1−A2 by virtue of $F_{int}=P_{int}*Ad$, a force which diminishes with the stroke since $P_{int}$ diminishes with the stroke and Ad is constant. In addition, a regulator force Fm=P*A1 works in the same direction as $F_{int}$ throughout the stroke.

Cumulatively, the regulator force $F=F_{int}+Fm=P*A1+P_{int}*Ad=P*A1+P*G1*Ad=P*(A1+G1*Ad)=P*G2$, in which G2 is a further purely geometry-conditioned factor.

The two series-connected restrictors R1 and R2 have together a regulating restrictor which is $R=R1*R2/\sqrt{(R1^2+R2^2)}$, which, inserted into the pressure-flow formula, gives $p=q^2/R^2=q^2*G3$, in which G3 is once again a wholly geometry-conditioned factor and the flow through the valve is denoted by q.

The cumulative regulator force is $F=q^2*G2*G3=q^2*G$ and is formed wholly from the described geometry and the velocity of the shock absorber (or equivalent), since the flow is solely dependent upon the velocity.

In a pressure regulator (pressure-limit valve), the pressure is regulated under a state of equilibrium between the regulator force, in this case F, and a corresponding cumulative force (caused by, for example, springs, flow forces, pilot pressure forces, etc.), which is dependent upon the valve type.

During the above-described smooth-opening process, the force equilibrium is maintained due to the fact that the pressure is forcibly increased owing to an exemplified, geometry-conditioned and successively reduced regulator area directly after the opening. The process occurs also in reverse, i.e. during closing with diminishing flow (velocity).

Figure 3:
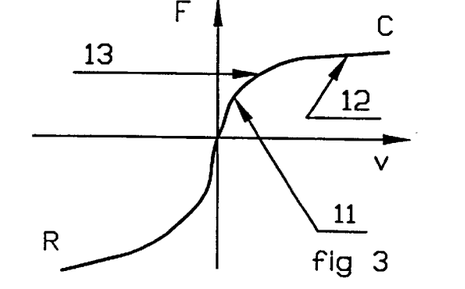
FIG. 3 shows a simplified static velocity-force diagram according to the present invention.

The above-specified roughness problem which arises due to abrupt changes in the damping force in dependence upon the said "blow-off" is eliminated with the aid of a new type of device, e.g. pressure regulator, which is characteristic of the present invention. The pressure regulator works in one embodiment with a multi-stage opening function. Reference is made to the curve according to FIG. 3, in which the horizontal axis indicates velocity v and the vertical axis indicates the force F, which parameters are comparable with a flow q and pressure P respectively according to the above. In the curve according to FIG. 3, a smooth opening point is denoted by 11 and the start of the curve part for the regulator function by 12. Between the points 11 and 12 there is a smooth opening distance 13. The smooth transition distance 13 should be compared with the abrupt point or elbow 6 in FIG. 1, which relates to the prior art. The advantage with the smooth transition according to the invention also becomes apparent if a comparison is made between FIGS. 2 and 4.

Reference is made to FIG. 6, which indicates the principle for the modus operandi of the new device 14, which works with two stages. The first stage utilizes an outer diameter d1. This first stage defines the zero point or starting position for the stroke s of the device. An inner edge 17 of a diameter d2 works with the same stroke as the outer edge but has a zero point or a starting position which is defined by an underlap ul. The new device according to FIG. 6 might be without the said bleed, compared with the bleed 7 in FIG. 5. Otherwise the structure of the realization according to FIG. 6 corresponds to the conventional design according to FIG. 5.

In FIG. 6, a regulator force is denoted by 15. This is altered during the stroke, not only in dependence upon normal changes in the pressure per se but also in dependence upon the change in regulator area. The first opening point is defined only by the diameter d1 and the area $A1=\pi/4*d1^2$ according to the above. This area is large, which means that the damping force, i.e. a pressure $P_o$ in the smooth opening point 11 (FIG. 3), is low. The outer edge works with a restrictor area 16 according to FIG. 6, which assumes the said value $R1=\pi/4*d1*s$ (compare also above). Immediately after the stroke s has increased to a certain level, in dependence upon the size of the underlap ul, the restrictor area of the inner edge 17, $R2=\pi*d2(ul+s)$ (compare also above), will severely affect the pressure. This means that a new regulator area $A2=\pi/4*d2^2$ has to be defined. The latter area is that which almost solely acts upon the regulator once the smooth opening 13 (FIG. 3) has been completed. The regulator area Ad=A1−A2 works together with flow-pressure transformation inside the governor valve. The intermediate pressure $P_{int}$ between R1 and R2 is altered from the opening pressure $P_o$ down to zero or a low value in connection with the smooth opening stage. Two things affect the size of the smooth opening, namely the change in the intermediate pressure $P_{int}$ and the change in the regulator area from A1 to A2.

FIG. 5 shows the differences in relation to the structure according to FIG. 6. In FIG. 5, the governor valve comprises only an edge and a diameter measure. In this case, the regulator force is denoted by 3 and the supplementary force according to the above by 4.

Concerning the geometry factor which depends upon d1, d2 and u, this represents the shape and size of the smooth opening when the shock absorber moves at a velocity v and generates the flow q. The example according to the above takes into account the direction of opening, i.e. the direction for increasing velocity. The valve controls a smooth motion for diminishing velocity also, i.e. for the closing direction. That which is above referred to as the opening point is therefore also a closing point. A number of variables can be involved in the example above, which does not however in principle alter the indicated function. The pressure governor valve (or equivalent) according to the invention can be used for all types of independently working pressure regulator valves for shock absorbers.

Figure 7:
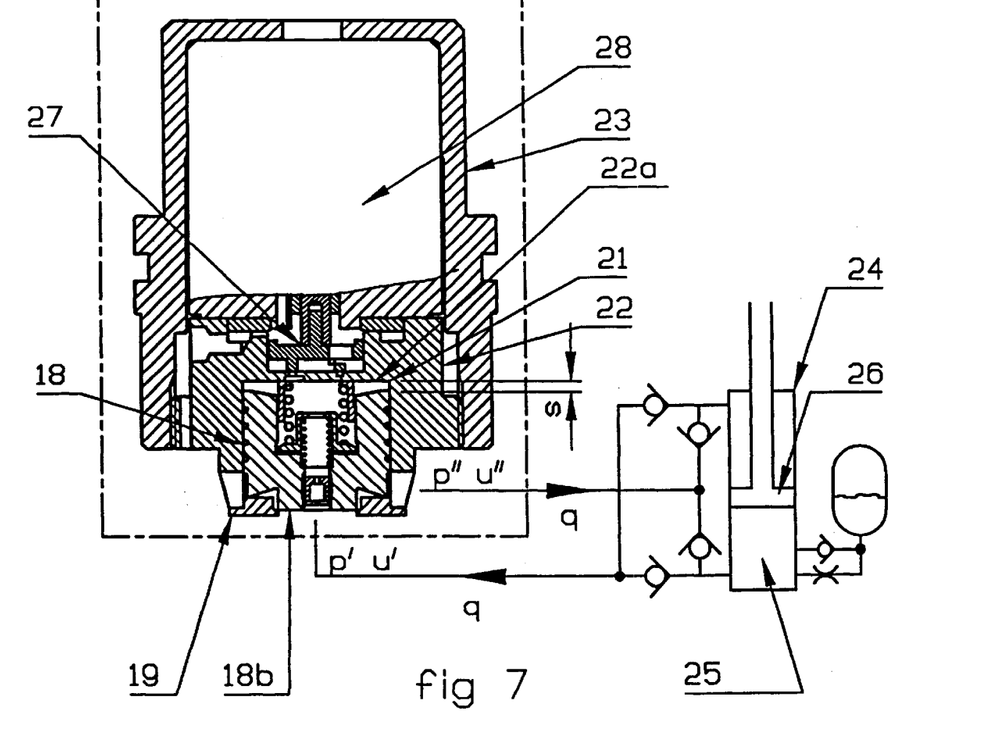
FIG. 7 shows in vertical section a constructive realization of a new governor valve which can be connected to a shock absorber shown in elementary representation.
Figure 8:
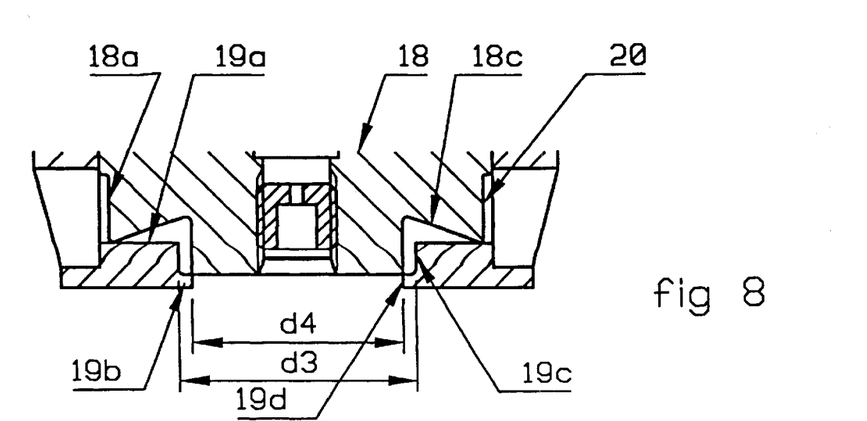

In FIGS. 7 and 8, a governor valve is shown with a cone 18 and a seat, which can be brought to interact with the cone, denoted by 19. The cone is constructed with an outer edge 20, which, in the closing position of the valve, can be brought to bear against a top surface 19a of the seat. The seat is provided with an inward-projecting flange 19b. The seat is thereby arranged with a first recess 19c of a diameter d3 and a second recess 19d of a diameter d4. In this case, the cone is constructed with a first disc-shaped or cylindrical part 18a, supporting the said outer edge 20, and a second cylindrical part 18b, extending down from the recess of the seat. The cylindrical part 18b has according to the above the diameter d2, which substantially corresponds to the diameter d4. The diameter d3 exceeds the diameter d2 according to FIG. 6. In this case, the underlap indicated in connection with FIG. 6 is so small that it is not apparent in the figure. For the formation of the outer edge 20, the first part 18a is provided with an oblique surface 18c, which merges into the said centre part 18b, i.e. that section of the first part 18a which supports the outer edge is tapered.

Figure 4:
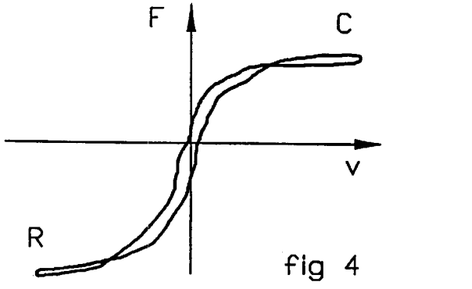
FIG. 4 shows a simplified dynamic velocity-force diagram for the present invention.

The cone 18 is mounted in a recess 21 in a housing 22, arranged such that it can be screwed in place inside an insert 23. The arrangement works in known manner together with a shock absorber 24 shown in elementary representation. The piston operates in a working fluid 25. By means of a top surface 22a in the housing 22, the maximum stroke s of the cone is determined according to the above. The cone 18 shall exercise an adjustable resistance to the motions of the piston in the working fluid relative to the cylinder. The main flow q via the valve is conducted between two spaces U' and U" on the bottom and top side (or input and output) of the valve. In the output position or closing position of the governor valve, the pressures P' and P" obtain in the said spaces whenever the piston 26 is accelerated. When the cone assumes an open position, it exercises a resistance against the flow of medium between the spaces U' and U" according to the above. The shown illustrative embodiment also incorporates a pilot valve arrangement 27 for controlling a pilot flow parallel with the said main flow. A solenoid is indicated by 28. With the solenoid, the level of the curves according to FIGS. 3 and 4 is obtained. The said solenoid, pilot arrangement, adjustment function, housing, insert and shock absorber are well known per se and shall not therefore be described here in greater detail. Reference can be made in this connection to EP 0508465 and 0508466 and to JP 09133171-A, JP 09112622-A, JP 09119472-A, JP 09112621-A, JP 8121523-A and JP 8128489-A. The invention can be used in pressure regulators, pressure limiters, pressure-regulating valves, in shock absorbers for motor cycles and multi-wheeled vehicles, etc.

Figure 9:
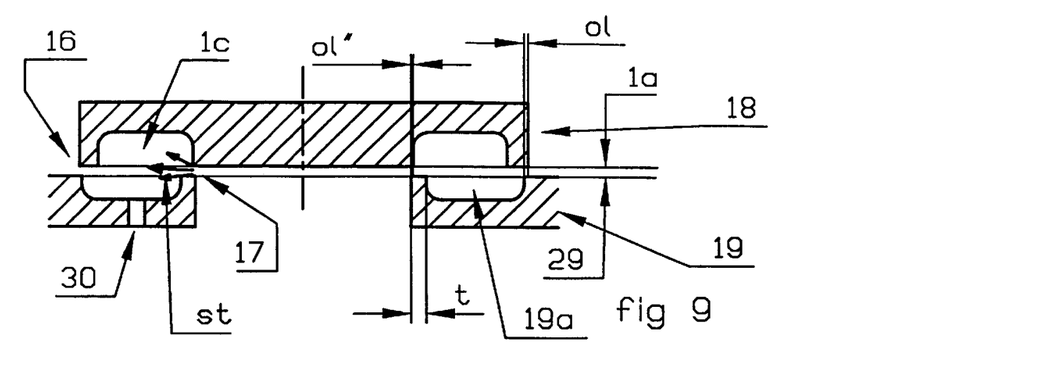
Figure 9A:
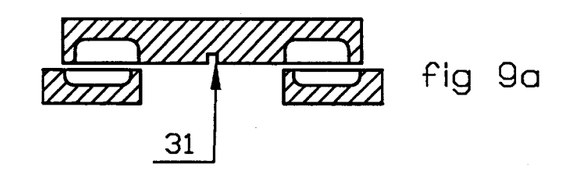

In FIGS. 9 and 9a, the valve/cone 1 is arranged such that a bottom surface 1a of the valve/cone is located in the same plane as those parts of the valve/cone bearing against the top surface 29 of the seat, i.e. the inner 17 and outer 16 restrictors lie in the same plane. In this case, there is therefore no underlap (ul) corresponding to that indicated above. Instead of having the area R2 of the inner restrictor be defined with the aid of the said underlap, a continuous hole 30 in the seat is in this case utilized, which hole leads into an annular space 1c, compare FIG. 9. Alternatively or supplementary thereto, according to FIG. 9a a groove 31 in the bottom surface of the valve/cone can be utilized, which groove can extend diametrically and past the large recess for the fluid in the seat. In the present case, the seat 19 is also provided with an annular recess 19a'. The recesses 1c and 19a' face each other and are mutually offset for the formation of the said inner and outer restrictors 17 and 16 and outer and inner overlaps o1' and o1" in the radial direction. As a result of its annular groove 19a', the part 19 has an inner upward-projecting edge or section, having a thickness t which is less than approx. 1 mm. The inner and outer overlaps measure approx. 0.1 mm. A jet st of fluid indicates that the fluid is prevented by the shapes of the recesses 1c and 19a' from actuating the discharge restrictor or from attaching to the cone or seat.

Figure 10:
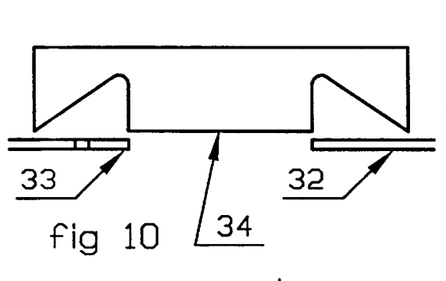

FIG. 10 shows a further alternative to the case in which the inner and outer restrictors of the valve/cone lie in the same plane (compare the case of FIGS. 9 and 9a). In this case, a flexible seat 32 is used, with the characteristic that the edge 33 of the seat by the recess 34 tends to a certain extent to follow the cone as the pressure is altered (e.g. increased), the valve being able to be made more seal tight at still higher modulation levels 35, compare the static velocity and force diagram according to FIG. 10a.

Figure 10A:
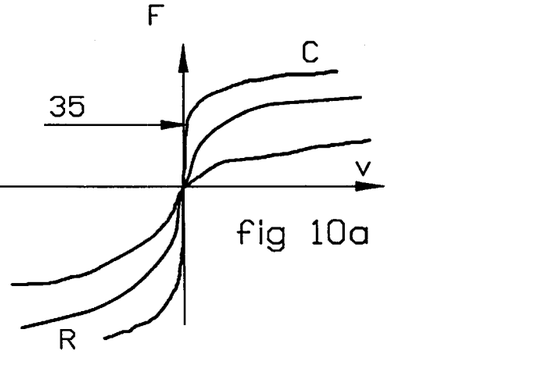
Figure 11:
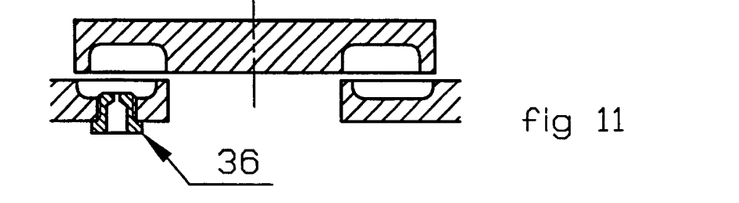

FIG. 11 shows a valve/cone arrangement in which an adjusting screw 36 for the adjustment of different levels according to FIG. 10a is disposed in a hole in the seat. The adjusting screw is accessible from the outside of the seat.

Figure 12:
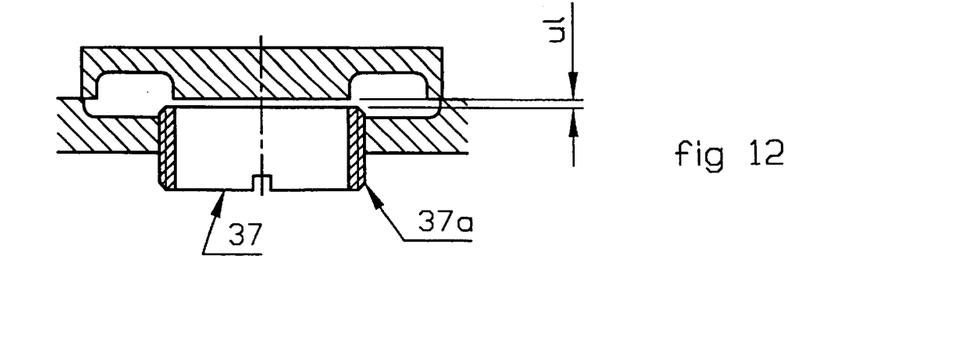

FIG. 12 shows an example of an underlap ul', which is achieved with a bush 37 which can be screwed into an internal thread in the seat recess by way of an external thread 37a. The hole in the bush runs in towards the cylindrical part of the cone or equivalent. The underlap is situated between the top edge (inner edge) of the bush and the bottom surface of the valve/cone.

The reference notations used in FIGS. 1–6 are assignable to the following constructive elements:

With the expression stroke a dynamical change or variation could be interpreted. The word restriction relates to the regulator area or area of adjustment (control). When the restriction is increased the adjustment or control or regulator area is increased, and vice versa. Thus, increasing the restriction relates to the increasing of the restriction or regulator area and decreasing the restriction relates to the decreasing of the restriction area or regulator area. In cases the word restriction is mentioned the involved area is meant. When the expression soft or softer curve formation or shape is discussed the word soft or softer shall be compared with the known dampers. The improved or, new valve according to the present invention allows tailor made curve shapes and is able to work with a large working range. The valve can be made very quick operating, in relation to the known valves.

The invention relates to a valve which continuously or with minor steps effects its regulation or controlling operation. It can be considered to work essentially without interuptions in its operation state. It works with areas depending on the stroke sizes. In an embodiment the new valve having a chamber which exists between the cone (slide) and the seat (housing). In an embodiment the valve having inner and outer restrictions (part restrictions). However, there is no need for arranging the two or more restrictions as inner and outer restrictions, but they can have another mutually positions, compare the embodiment of FIG. 14.

Figure 13:
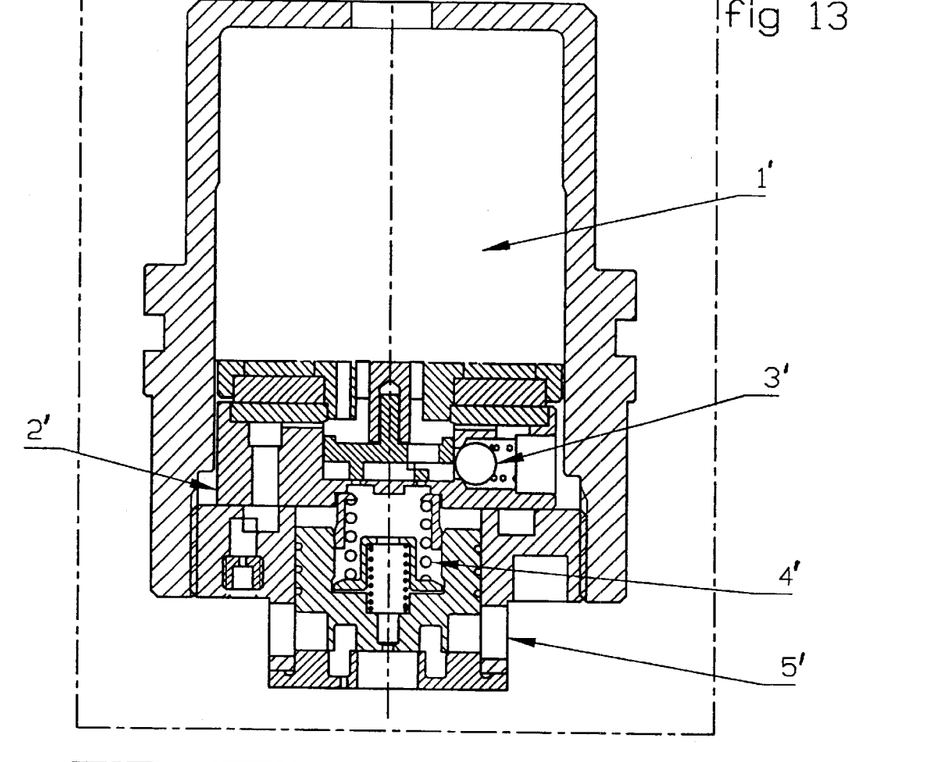
Figures 13A, 13B:
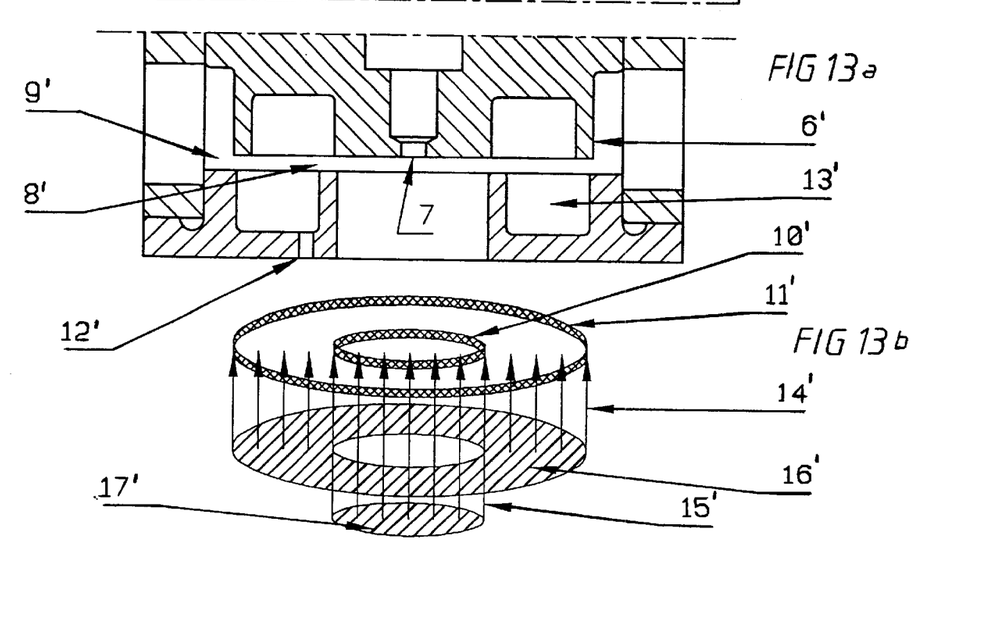

FIG. 13 shows a complete solenoid controlled pilot operated valve including solenoid 1', pilot valve 2', fail-safe function 3', damping and spring arrangement 4', and main function 5'. In FIG. 13b is shown a magnified part of the main valve poppet 6'. The inlet jet to the pilot system is here a hole 7'.

Compared with FIG. 9 the restriction (R2) 8' and the restriction (R1) 9' are in this case forming the inner 10' and an outer 11' ring shaped stroke (s) dependent curtain areas planed on the same plane, which is more clearly shown in FIG. 13b. Instead of letting the area in (R2) be defined by the underlap (ul) this embodiment having a hole 12' leading into the ring shaped chamber 13'. The variation of the restrictions (R1) and (R2) are successively making the pressure (pint) 14' inside the chamber to be lower than the regulated pressure (p) 15'. The pressure (pint) is acting on a ring shaped part of the total regulator area (Ad) which is seen in a projected from 16' which the remaining part of the regulator area (A2) is circular shaped 17'. The total regulator force is defined by (p*A2+pint*Ad) and is biasing the sum of other forces from pilot pressure, springs and flow. The size of the areas (A2) and (Ad) is a strong tool to shape and customise the pressure-flow that is force velocity curves of shock.

Figure 14:
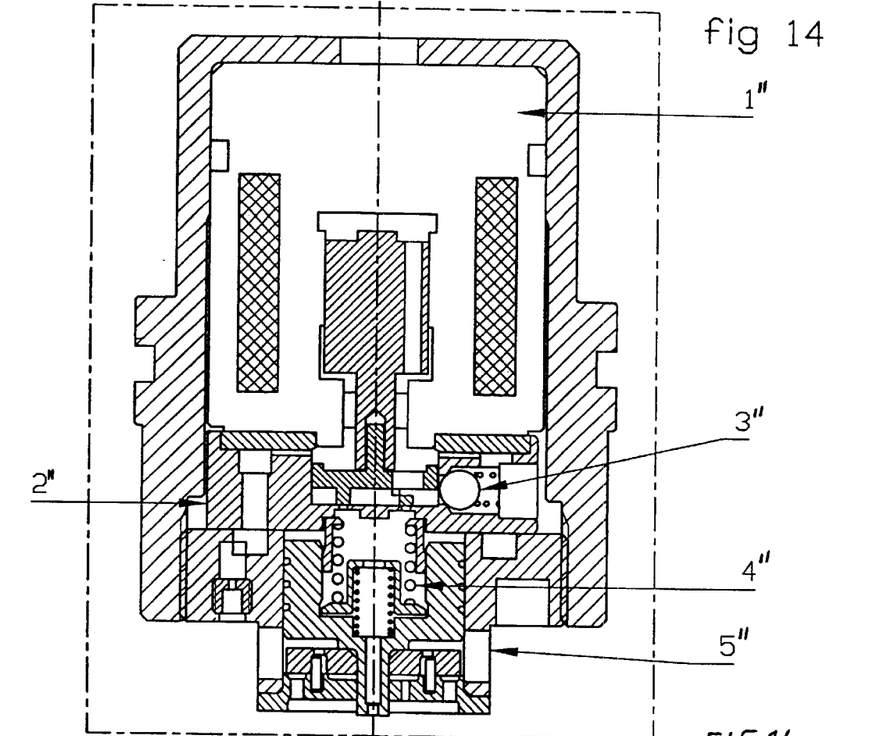
Figure 14A:
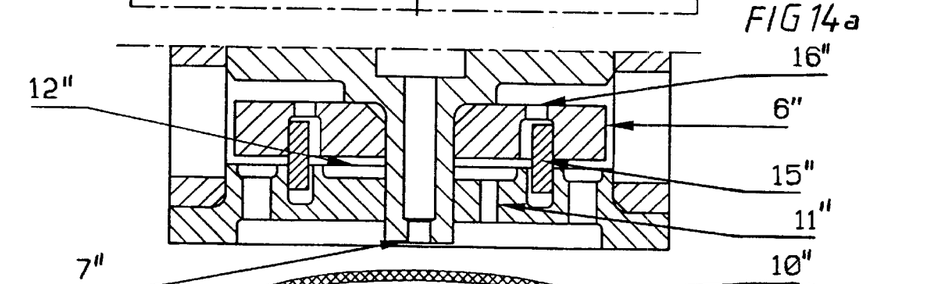

FIG. 14 shows a further geometry of the valve including a complete known solenoid controlled pilot operated valve having solenoid 1", pilot valve 2", fail-safe function 3", damping and spring arrangement 4" and main function 5". In FIG. 14a is shown a magnified part of the main valve poppet 6". The inlet jet to the pilot system is a hole 7". The by stroke(s) or any restriction unaffected part of the total regulator area (A3) 7" is distributed on two places on which the regulated pressure (p) 8" is acting. The varied pressure (pvar) 9" is reduced due to the opening of the outlet restriction area (R3) 10" because of a fixed inlet restriction hole 11" into the ring shaped chamber 12". A projected part of the regulator area called (A4) 13" is added to the regulator area (A3). The total regulator force is defined by (A3*p+A4*pint) and is biasing the sum of the other forces from pilot pressure, springs and flow. A regulated main restriction (R4) 14" is managing the main pressure-flow transformation with a big other diameter and no interference with the moving poppet because of the baffle plate 15" which is preventing the main flow from passing the holes 16". This is an advantage due to a clean flow free from turbulence and disturbance flow forces. The holes 16" are also venting the restriction area (R3).

Figure 14B:
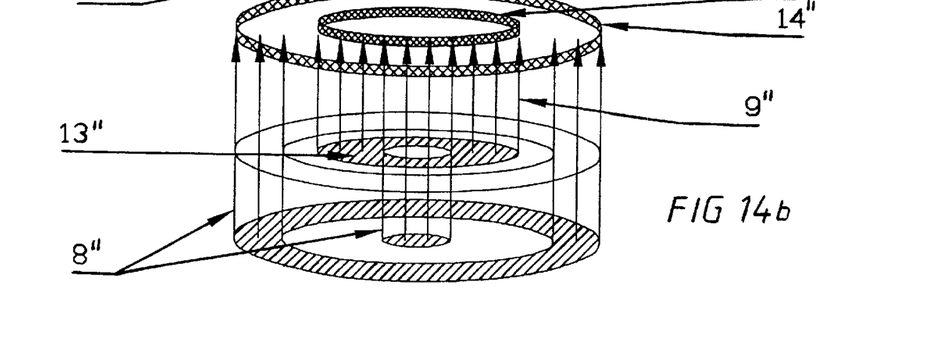

There are a difference between the above described designs and the design of FIG. 14. (R2) and (R1) are in the designs of earlier described situated in series and both are regulating the main flow. The present (R3) and (R4) of FIG. 14 are completely separated and only (R4) is regulating the main flow. FIG. 14b is to be compared with FIG. 13b.

The reference notations used in FIGS. 1–14b are assignable to the following constructive elements:

| | |
|---|---|
| pressure governor valve | 1) |
| main restrictor | 2) |
| regulator force | 3) |
| supplementary forces | 4) |
| character | 5) |
| opening point | 6) |
| fixed restrictor | 7) |
| leak curve | 8 |
| springing | 9) |
| vibrations | 10) |
| opening point | 11) |
| regulator function | 12) |
| smooth opening | 13) |
| new governor valve | 14) |
| new regulator force | 15) |
| outer edge restrictor | 16) |
| inner edge restrictor | 17) |
| cone | 18) |
| first cylindrical part | 18a) |
| second cylindrical part | 18b) |
| oblique surface | 18c) |
| seat | 19) |
| top surface | 19a) |
| annular recess | 19a') |
| inward-projecting flange | 19b) |
| first recess | 19c) |
| second recess | 19d) |
| outer edge | 20) |
| recess | 21) |
| housing | 22) |
| insert | 23) |
| shock absorber | 24) |
| working fluid | 25) |
| piston | 26) |
| pilot valve arrangement | 27) |
| solenoid | 28) |
| seat top surface | 29) |
| seat hole | 30) |
| cone groove | 31) |
| shim seat | 32) |
| seat edge | 33) |
| seat recess | 34) |
| curve | 35) |
| adjusting screw | 36) |
| bush | 37) |
| upper space | U') |
| pressure in upper space | p') |
| lower space | U") |
| pressure in lower space | p") |
| stroke | S) |
| underlap | ul, ul') |
| fluid jet | st) |
| solenoid | 1', 1") |
| pilot valve | 2', 2") |
| fail-safe function | 3', 3") |
| damping and spring arrangement | 4', 4") |
| main function | 5', 5") |
| valve poppet | 6', 6") |
| hole | 7', 7") |
| restriction | 8', 8") |
| restriction | 9', 9") |
| restriction curtain area | 10', 11') |
| restriction area | 10") |
| restriction hole | 11") |
| hole | 12') |
| chamber | 12") |
| chamber | 13') |
| regulator area | 13") |
| pressure | 14') |
| restriction | 14") |
| pressure | 15') |
| baffle plate | 15") |
| projection | 16') |
| hole | 16" |
| regulator area | 17') |

The invention is not limited to the illustrative embodiment according to the above but can be subject to modifications within the scope of the following patent claims and the inventive concept.

What is claimed is:

1. An adjustable, uni-directional pressure regulator, comprising:
   a housing having a seat portion provided at one end thereof, the seat portion having an opening provided therein that communicates with an opening provided in said housing, said housing opening being larger than the seat portion opening; and
   a moveable element moveably provided within the housing opening, said moveable element being subjected to a first pressure on one side thereof facing said housing, and being subjected to a second pressure on another side thereof by a fluid flowing through the seat portion opening, wherein said moveable element and the seat portion are offset from each other in a common plane to form first and second variable fluid passageways therebetween, and fluid flows in one direction through the seat portion opening, the first variable passageway, the second variable passageway, and exits the pressure regulator.

2. The adjustable, uni-directional pressure regulator according to claim 1, wherein the first and second variable passageways mutually vary in size depending upon the first and second pressures being exerted upon said moveable element.

3. The adjustable, uni-directional pressure regulator according to claim 1, wherein when the second pressure exerted upon said moveable element is greater than the first pressure exerted thereon, the first variable passageway increases in size, allowing the fluid flowing in one direction to freely flow through the first variable passageway; and wherein when the second pressure exerted upon said moveable element is less than the first pressure exerted thereon, the first variable passageway decreases in size, restricting the fluid flowing in one direction through the first variable passageway.

4. The adjustable, uni-directional pressure regulator according to claim 1, wherein when the second pressure exerted upon said moveable element is greater than the first pressure exerted thereon, the second variable passageway increases in size, allowing the fluid flowing in one direction to freely flow through the second variable passageway; and wherein when the second pressure exerted upon said moveable element is less than the first pressure exerted thereon, the second variable passageway decreases in size, restricting the fluid flowing in one direction through the second variable passageway.

5. The adjustable, uni-directional pressure regulator according to claim 1, wherein when the second pressure exerted upon said moveable element is greater than the first pressure exerted thereon, the first and second variable passageways successively increase in size, allowing the fluid flowing in one direction to freely flow through the first and second variable passageways; and wherein when the second pressure exerted upon said moveable element is less than the first pressure exerted thereon, the first and second variable passageways successively decrease in size, restricting the fluid flowing in one direction through the first and second variable passageways.

6. A suspension system, comprising:
   a shock absorber having a piston and a cylinder; and
   an adjustable, uni-directional pressure regulator communicating with a fluid provided between the piston and the cylinder of the shock absorber, the pressure regulator having:
   a housing having a seat portion provided at one end thereof, the seat portion having an opening provided therein that communicates with an opening provided in the housing, the housing opening being larger than the seat portion opening, and
   a moveable element moveably provided within the housing opening, the moveable element being subjected to a first pressure on one side thereof facing the housing, and being subjected to a second pressure on another side thereof by a fluid flowing through the seat portion opening, wherein the moveable element and the seat portion are offset from each other in a common plane to form first and second variable fluid passageways therebetween, and fluid flows in one direction through the seat portion opening, the first variable passageway, the second variable passageway, and exits the pressure regulator,
   wherein said pressure regulator provides a smooth variation of the damping force of said shock absorber, substantially eliminating the roughness of the relative motions of the piston and the cylinder of said shock absorber.

7. The suspension system according to claim 6, wherein said pressure regulator substantially eliminates vibration in the suspension system.

8. An adjustable pressure regulator, comprising:
   a housing having a seat portion provided at one end thereof, the seat portion having an opening provided therein that communicates with an opening provided in said housing, said housing opening being larger than the seat portion opening; and
   a moveable element moveably provided within the housing opening, said moveable element having a recess provided therein and facing the seat portion, wherein said moveable element and the seat portion are offset from each other in a common plane to form first and second variable fluid passageways therebetween, the first variable fluid passageway is adjacent to the recess formed in said moveable element, and the first and second variable fluid passageways are situated in the common plane and vary in size dependent upon movement of said moveable element toward and away from the seat portion.

9. The adjustable pressure regulator according to claim 8, wherein the seat portion of said housing has a thickness of less than 1.0 millimeters.

10. The adjustable pressure regulator according to claim 8, wherein the moveable element recess prevents fluid from adhering to the surface of either of said housing, the seat portion of said housing, or said moveable element.

11. The adjustable pressure regulator according to claim 8, wherein said moveable element has an opening provided therein and in fluid communication with the seat portion opening.

12. The adjustable, uni-directional pressure regulator according to claim 5, wherein the change in sizes of the first and second variable passageways either increases or decreases an intermediate fluid pressure arising between the first and second variable passageways, a first fluid pressure area is formed adjacent the first variable passageway, a second fluid pressure area is formed adjacent the second variable passageway, and the intermediate fluid pressure acts upon one of the first fluid pressure area, the second fluid pressure area, or both.

13. The adjustable, uni-directional pressure regulator according to claim 1, wherein the first pressure exerted upon said moveable element is exerted by one a spring, a fluid flow, or a pilot valve pressure force, a force equilibrium is achieved between the first and second pressures exerted upon said moveable element by successively increasing or decreasing the sizes of the first and second variable fluid passageways.

14. A suspension system, comprising:

a shock absorber having a piston and a cylinder; and an adjustable, uni-directional pressure regulator communicating with a fluid provided between the piston and the cylinder of the shock absorber, the pressure regulator having:

a housing having a seat portion provided at one end thereof the seat portion having an opening provided therein that communicates with an opening provided in the housing, the housing opening being larger than the seat portion opening, and a moveable element moveably provided within the housing opening, the moveable element being subjected to a first pressure on one side thereof facing the housing, and being subjected to a second pressure on another side thereof by a fluid flowing through the seat portion opening, wherein the moveable element and the seat portion are offset from each other in a common plane to form first and second variable fluid passageways therebetween, and fluid flows in one direction through the seat portion opening, the first variable passageway, the second variable passageway, and exits the pressure regulator.

15. The suspension system according to claim 14, wherein when the second pressure exerted upon the moveable element is greater than the first pressure exerted thereon, the first and second variable passageways successively increase in size, allowing the fluid flowing in one direction to freely flow through the first and second variable passageways; and wherein when the second pressure exerted upon the moveable element is less than the first pressure exerted thereon, the first and second variable passageways successively decrease in size, restricting the fluid flowing in one direction through the first and second variable passageways.

* * * * *